3,539,639
CERTAIN PYRIDINOXY OR PYRIDINE THIO-
SALICYL ANILIDES AND N-PHENOXY-
PYRIDYL SALICYLAMIDES
Helmut Mrozik, Matawan, N.J., assignor to Merck & Co.,
Inc. Rahway, N.J., a corporation of New Jersey
No Drawing. Filed Nov. 22, 1967, Ser. No. 684,968
Int. Cl. C07d *31/44, 31/50*
U.S. Cl. 260—294.8                                          9 Claims

ABSTRACT OF THE DISCLOSURE

Salicylic acid derivatives of phenoxy- and phenylthio-pyridines. Processes for the preparation of substituted salicylic acid derivatives of phenoxy- and phenylthio-pyridines. Anthelmintic compositions useful in the treatment of parasitic disesases containing a substituted salicylic acid derivative of a phenoxy- or phenylthiopyridine as an active ingredient.

BACKGROUND OF THE INVENTION

Field of the invention

The invention relates to new chemical compounds which can be described as azasalicylanilides, pyridine-oxysalicylanilides, and pyridinethiosalicylanilides. These novel compounds are tricyclic, and each ring may be variously substituted.

Description of the prior art

Certain substituted salicylanilides are known in the art, and various methods have been employed for their preparation. The substituted salicylic acid derivatives which are the subject of this invention, however, unlike those known in the art, are derivatives of phenoxy- and phenylthiopyridines wherein any of the three aromatic rings of the salicylanilide can be variously substituted. The third aromatic ring of the salicylanilide can be linked at a carbon ortho, meta or para to the nitrogen of the carboxamide.

SUMMARY OF THE INVENTION

An object of this invention is to provide novel salicylic acid derivatives of phenoxy- and phenylthiopyridine. Methods for synthesizing these novel compounds are described, and anthelmintic compositions are provided which comprise one or more of the substituted salicylic acid derivatives intimately dispersed in a suitable carrier vehicle. Also within the scope of the present invention are the non-toxic acid or amine addition salts of the salicylanilides. In accordance with this invention, it has been found that the salicylic acid derivatives of phenoxy- and phenylthio-pyridines are active anthelmintics and are particularly effective against liver fluke of the species *Fasciola gigantica* and *Fasciola hepatica,* and against gastrointestinal parasitic worms, in particulr those of the species *Haemonchus contortus* of sheep.

DESCRIPTION OF THE PREFERRED EMBODIMENTS

The novel salicylic acid derivatives of the present invention fall into two classes depending upon whether the pyridine ring nitrogen falls in the B or C ring, and these compounds can be structurally depicted as follows:

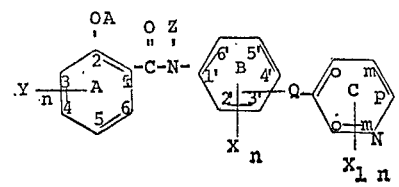

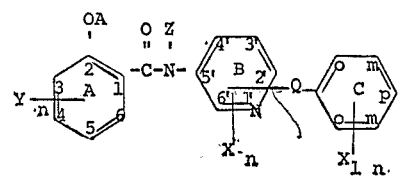

where A is hydrogen or loweralkanoyl, such as acetyl, propionyl, and valeryl; $n$ equals 0–3; Y is halogen, such as chlorine, bromine, and iodine, hydroxy, halo lower-alkyl, such as trifluoromethyl, or nitro; X and $X_1$ are halogen, such as chlorine, bromine and iodine, lower-alkyl, such as methyl, ethyl, propyl, and amyl; haloalkyl, such as trifluoromethyl; loweralkoxy, such as methoxy, ethoxy, and butoxy, nitro, cyano, halo loweralkoxy, such as chloromethoxy and bromobutoxy, halo loweralkylthio, such as chloroethylthio and bromobutylthio, and amino; Z is hydrogen or loweralkyl, such as methyl, propyl, and butyl; and Q is an oxygen atom or a sulfur atom, provided that Ring C is linked to Ring B at any unsubstituted carbon atom of Ring B, and that any one of the unsubstituted carbon atoms of either of aromatic Rings B and C can be replaced by nitrogen, but that only one of the carbons of the aromatic rings is replaced by nitrogen at any one time. The substitutents Y, X and $X_1$ on the aromatic rings need not be the same on any one compound.

As can be seen from the foregoing structural formulae, the compounds of the present invention are tricyclic, and each ring can be variously substituted. Any one of the unsubstituted carbons of Rings B and C can be replaced by nitrogen provided that in any one compound only one carbon is replaced by nitrogen at any one time. The point of attachment between Ring B and Ring C can be at any unsubstituted carbon on the amide. The preferred compounds, however, are those wherein the point of attachment is para to the nitrogen of the carboxamide.

Typical of the compounds within the scope of the present invention are:

3,5-diiodo-N-[2-(3-trifluoromethylphenoxy)-5-pyridyl]-6-hydroxysalicylamide;
5-bromo-N-[2-(3,4-dichlorophenoxy)-6-hydroxy-5-pyridyl]-3-nitrosalicylamide;
3,5-dibromo-N-[2-(p-chlorophenylthio)-5-pyridyl]-6-hydroxysalicylamide;

3,5-diiodo-N-[2-(p-chlorophenylthio)-5-pyridyl]-6-hydroxysalicylamide;
3,5-dibromo-N-[2-(p-chlorophenoxy)-4-chloro-5-pyridyl]-salicylamide;
3,5-dibromo-N-[2-(3,4-dichlorophenoxy)-5-pyridyl]-6-hydroxysalicylamide;
3,5-diiodo-N-[3-(3-trifluoromethylphenoxy)-5-pyridyl]-6-hydroxysalicylamide;
3,5-diiodo-N-[3-(p-chlorophenylthio)-5-pyridyl]-salicylamide;
5-bromo-N-[3-,4-dichlorophenoxy)-4-chloro-5-pyridyl]-3-nitrosalicylamide;
3,5-dibromo-N-[3-(3,4-dichlorophenylthio)-5-pyridyl]-6-hydroxysalicylamide;
3,5-dibromo-N-[3-(3-trifluoromethylphenoxy)-4-chloro-5-pyridyl]-6-hydroxysalicylamide;
3,5-dibromo-N-[3-(3,4-dichlorophenoxy)-5-pyridyl]-6-hydroxysalicylamide;
3,5-diiodo-N-[4-(3-trifluoromethylphenoxy)-5-pyridyl]-salicylamide;
3,5-dibromo-N-[4-(3,4-dichlorophenoxy)-5-pyridyl]-salicylamide;
3,5-diiodo-N-[4-(p-chlorophenylthio)-5-pyridyl]-salicylamide;
3,5-dibromo-N-[4-(3-trifluoromethylphenoxy)-4-chloro-5-pyridyl]-6-hydroxysalicylamide;
3,5-dibromo-N-[3-(3,4-dichlorophenylthio)-5-pyridyl]-salicylamide;
5-bromo-3'-chloro-3-nitro-4'-(3-pyridinoxy)-salicylanilide;
3'chloro-3,5-dibromo-4'-(3-pyridinoxy)-salicylanilide;
3,5-dibromo-4'-(3-pyridinoxy)-salicylanilide;
3'-chloro-3-nitro-4'-(3-pyridinoxy)-salicylanilide;
3,5-dibromo-4'-(3-pyridinethio)-salicylanilide;
3'-chloro-3,5-dibromo-4'-(3-pyridinethio)-salicylanilide;
3'-chloro-3-nitro-4'-(3-pyridinethio)-salicylanilide;
5-bromo-3'-chloro-3-nitro-4'-(3-pyridinethio)-salicylanilide;
3,5-dibromo-3'-(3-pyridinethio)-salicylanilide;
3'-chloro-3,5-dibromo-4'-(4-pyridinethio)-salicylanilide;
3,5-dibromo-N-[2-(3-cyanophenoxy)-5-pyridyl]-salicylamide;
3,5-dibromo-N-[2-(4-methoxyphenoxy)-5-pyridyl]-salicylamide;
5-bromo-3-nitro-N-[2-(4-trifluoromethoxyphenoxy)-5-pyridyl]-salicylamide; and
3,5-diiodo-N-[2-(4-nitrophenoxy)-5-pyridyl]-salicylamide.

Also within the scope of the present invention are the pharmaceutically acceptable replacement or addition salts of Formula I such as metal salts, exemplified by alkali metals such as sodium and potassium, and alkaline earth metals such as barium, calcium, copper and the like, and amine salts such as the pyridine, piperazine, methylamine, ethanolamine salts, and the like. It is also contemplated that the salicylanilides of this invention can be employed in combination with other known non-antagonistic anthelmintic agents such as thiabendazole, tetramisole, piperazine, phenothiazine, pyrantel, and the like. The type of combination to be employed would depend upon the type of and degree of infection to be combatted and the mode of administration to be employed.

The compounds of the present invention can be prepared by reacting an appropriately substituted pyridinoxyaniline, pyridinethioaniline, phenoxyaminopyridine, or phenylthioaminopyridine compound with an appropriately substituted salicylic acid compound, as illustrated in the following diagram. The diagram illustrates the preparation of a salicylic acid derivative via reaction of a salicylic acid compound and phenylthioaminopyridine or phenoxyaminopyridine compound, but the same scheme is followed to prepare the compounds where the amine reactant is a pyridinethioaniline or a pyridinoxyaniline compound.

where A, X, $X_1$, Y, Z and $n$ are as previously defined. By appropriately substituted is meant that those substituents Y and X which are desired in the final product (Compound I) are present in the reagent Compounds II and III. Formation of some of the compounds of Formula I by direct substitution of certain substituents into the salicylanilide is also contemplated.

One preferred method of preparing the salicylic acid derivatives consists of reacting about equimolar amounts of the free acid and substituted aniline or substituted aminopyridine compound in a suitable solvent with about an equivalent amount of a halogenating agent such as phosphorus trichloride, phosphorus pentachloride or thionyl chloride. The temperature of the reaction is not critical. Good results are obtained at temperatures ranging from room temperature to the reflux temperature of the mixture. It is preferred, however, to conduct the reaction at elevated temperatures and preferably at the reflux temperature of the reaction mixture. Temperatures ranging from room temperature to about 200° C. are suitable. Suitable solvents in which the reaction can be carried out are benzene, toluene, xylene, chlorobenzene, carbon tetrachloride, diethyl ether, and the like. Generally, the product settles out of solution and is collected by filtration. Where necessary, the reaction mixture may be concentrated to the point where the product begins to settle out of solution. Purification is achieved by recrystallization or by other techniques known in the art.

Where practical, the novel salicylic acid derivatives can be prepared by first preparing the acid chloride of the salicylic acid compound by reaction with, for example, thionyl chloride, and then subsequently reacting the acid chloride with the substituted amino compound.

In order to maximize yields of Compound I, it may be desirable in some cases to protect the phenol group of Compound II to eliminate the possibility of interaction between the acid halide group of one molecule of Compound II with the unprotected phenol group of another or with that of the product. This may be achieved by acylating Compound II before use using, preferably, acetylation with, for example, acetic anydride.

Compound I wherein Z is loweralkyl is obtained by choosing the respective starting materials for the reaction sequence followed in preparing the substituted aniline or aminopyridine compounds, or by alkylating Compound I wherein Z is hydrogen by reacting it with suitable alkylating agents such as methyl, ethyl, or propyl halides or sulfates.

Compound I where A equals loweralkanoyl and Y is other than OH can be prepared from the salicylanilide by acylation with a suitable acylating agent such as acetic anhydride or propionic anhydride, or by reaction with an acid chloride, such as propionyl chloride or valeryl chloride.

The substituted aminopyridine and aniline reactants of Formula III in which the phenoxy, phenylthio, pyridinoxy or pyridinethio group is para to the amine nitrogen atom (such compounds hereafter designated Compound III–a) are prepared in a series of reactions depicted in the following flow diagram. For simplicity, the ring nitrogen in Compound III–a is shown in the position meta to the amine group of Ring B, etc., but it should be understood that the sequence will also work where the nitrogen is ortho to the amine group. The same sequence is followed to form the substituted aniline compounds where the ring nitrogen of Compound I is found in the C ring:

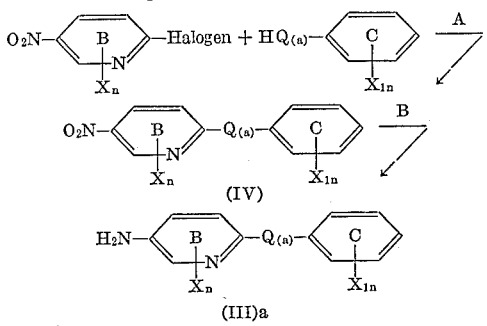

in which X, $X_1$ and $n$ are as previously defined, and $Q_{(a)}$ is a sulfur or oxygen atom.

As can be seen from the above, the process for producing Compounds III–a involves condensing, in Step A, an appropriately substituted p-halonitropyridine or p-halonitrobenzene, with an appropriately substituted phenol, thiophenol, thiopyridine, or hydroxypyridine. The condensation product is a phenoxynitropyridine, phenylthionitropyridine, pyridinoxynitrobenzene, or pyridinethionitrobenzene, which is next reduced, in Step B, to convert the nitro group thereof to an amino group. It will be noted that the phenoxy or phenylthio group in Compounds III–a is positioned para to the amino nitrogen atom. Such compounds when used in the preparation of Compounds I will yield what has been referred to as the 4′isomer. Where Compounds III having Q in the ortho position relative to the amino group are desired, orthohalonitropyridines or o-halonitrobenzenes are used in the procedure instead of para-halonitropyridine. Where the nitropyridines are substituted in both the ortho and para positions with halo atoms, both ortho and para condensation products will be obtained in Step A which may be separated by chromatographic techniques. Where the meta position of Q relative to the amino group in Compounds III is desired, a modification of the above procedure, as more specifically shown hereinafter, is effective to achieve such a result.

To obtain Compounds III wherein the point of attachment of Q is meta to the amino group, Compounds III–a are subjected to a series of reactions, the effect of which is to introduce an amino group or a group which can be converted to an amino group at the appropriate position. In general, this is achieved by blocking the amino group of Compounds III–a with an acyl group using, for example, acetic anhydride, nitrating the compound with a suitable nitrating system, for example, an acetic anhydride-nitric acid system, then removing the acyle group by hydrolysis with, for example, sodium hydroxide, potassium hydroxide, or the like, then diazotizing the free amine, and reductively eliminating the resulting diazo group, all in a manner known in the art. The newly introduced nitro group is then reduced to the amino group in the manner described for Step B above and is then available for reaction with the salicylic acid Compound II.

More particularly, Step A of the above procedure involves reacting the p-halonitropyridine or p-halonitrobenzene compound with the phenol, thiophenol, hydroxypyridine, or mercaptopyridine, as the case may be, preferably in a fusion reaction. The fusion itself involves heating the reactants to their molten state, preferably in the presence of a catalyst such as metallic copper, cuprous chloride, cupric chloride, and the like. The reaction must be carried out in the presence of a base such as potassium hydroxide, sodium hydroxide, sodium hydride, potassium carbonate, sodium carbonate, sodium bicarbonate, potassium bicarbonate, and the like. Solvents may be employed, if desired, and suitable results are obtained with dimethylformamide, dimethylsulfoxide,, biphenyl ether, and the like. A convenient temperature for either a fusion or solution reaction is in the range of from 100°–300° C. The substituted nitropyridine or nitrobenzene product of the reaction is generally obtained as a solid and may be recrystallized in accordance with well-known techniques.

Step B in the preparation of Compounds III–a consists of reducing the phenoxynitropyridine, phenylthionitropyridine, pyridinoxynitrobenzene, or pyridinethionitrobenzene compound obtained in Step A (Compound IV) to convert the nitro group thereof to an amino group. Any system capable of reducing nitro groups may be employed provided due consideration is given to maintaining the rest of the molecule intact. For example, catalytic reductions using hydrogen and Raney nickel or platinum may be employed. Chemical reductions using metals such as iron or zinc in the presence of acids may also be used. Catalytic hydrogenations are preferred and are conveniently run at room temperature at a hydrogen pressure of from about 20 to 100 p.s.i.g. Where any of X and $X_1$ are reducible groups such as nitro or cyano, for example, selective reduction of the desired group may be achieved by known techniques, as, for example, by using mild reducing agents such as hydrogen sulfide or salts thereof.

The compounds of the present invention have utility in the fields of animal therapy. They are effective anthelmintics and are especially effective against mature and inmature liver fluke of the species *Fasciola gigantica* and *Fasciola hepatica*, the common liver fluke in sheep and cattle, and against gastrointestinal parasitic worms and in particular those of the species *Haemonchus contortus*. For effective treatment, certain dosage levels are desired, depending upon the compound employed, the type of animal to be treated, and the particular helminth being combatted. In general, effective fluke efficacy is achieved when the compound is administered in a single dose at dosage levels of from about 1–300 mg./kg. of animal body weight, preferably from about 2–50 mg./kg. of animal body weight.

The compounds of the present invention may be administered in a variety of ways, depending upon the particular animal to be treated, the type of anthelmintic treatment normally given to such an animal, the materials employed, and the particular helminth being combatted. It is preferred to administer them in a single efficacious oral or parenteral dose at a time when fluke infection is apparent or suspected.

In general, compositions containing the active anthelmintic compound are employed, the amounts of the anthelmintic ingredient in the composition, as well as the remaining constituents varying according to the type of treatment to be employed, the host animal, and the particular parasitic disease being treated. In general, however, compositions containing a total weight percent of the active compound ranging from 0.001 to 95% will be suitable with the remainder being any suitable carrier or vehicle. Furthermore, the compositions should contain enough of the active compound to provide an effective dosage for the proper treatment of the parasitic disease.

A number of modes of treatment may be employed and each to some extent determines the general nature of the composition. For example, the anthelmintic compounds may be administered to domesticated animals in a single unit oral dosage form such as a tablet, bolus, capsule, or drench; in a liquid oil base form suitable for parenteral administration; or they may be compounded as a feed premix to be later admixed with the animal's food.

When the compositions are to be solid unit dosage forms as in tablets, capsules or boluses, the ingredients other than the active compounds may be any other pharmaceutically acceptable vehicles convenient in the preparation of such forms, and preferably materials nutritionally suitable such as starch, lactose, talc, magnesium stearate, vegetable gums, and the like. Moreover, when capsules are employed, the active compound may be used in essentially undiluted form, the only extraneous material being that of the capsule casing itself which may be hard or soft gelatin or any other pharmaceutically acceptable encapsulating material. When the dosage form is be to used for parental administration, the active material is suitable admixed with an acceptable oil base vehicle, preferably of the vegetable oil variety, such as peanut oil, cottonseed oil, and the like. In all of such forms, i.e., in tablets, boluses, capsules and oil base formulations, the active compound conveniently ranges from about 5 to 80% by weight of the total composition.

When the unit dosage form is to be in the form of a drench, the anthelmintic agents may be mixed with agents which will aid in the subsequent suspending of the active compound in water, such as bentonite, clays, water-soluble starches, cellulose derivatives, gums, surface active agents and the like to form a dry pre-drench ccmposition, and this pre-drench composition added to water just before use. In the pre-drench formulation, in addition to the suspending agent, such ingredients as preservatives, antifoam compounds, and the like may be employed. Such a dry product may contain as much as 95% by weight of the active compound, the rest being contributed by the excipients. Preferably, the solid composition contains from 30% to 95% by weight of the active compound. Enough water should be added to the solid product to provide the proper dosage level within a convenient amount of liquid for a single oral dose. The commonly used measure in the field is one fluid ounce of material and thus that one fluid ounce of material should contain enough of the anthelmintic compound to provide the effective dosage level. Liquid drench formulations containing from about 10 to 30 weight percent of the dry ingredients will in general be suitable with the preferred range being from 15 to 50 weight percent.

Where the compositions are intended to be used as feeds, feed supplements or feed premixes, they will be mixed with suitable ingredients of an animal's nutrient ration. The solid orally ingestible carriers normally used for such purposes, such as distillers' dried grains, corn meal, citrus meal, fermentation residues, ground oyster shells, Attapulgus clay, wheat shorts, molasses solubles, corn cob meal, edible vegetable substances, toasted dehulled soya fluor, soybean mill feed, antibiotic mycelia, soya grits, crushed limestone and the like are all suitable. The active compounds are intimately dispersed or admixed throughout the solid inert carrier by methods such as grinding, stirring, milling or tumbling. By selecting proper diluents and by altering the ratio of carrier to active ingredient, compositions of any desired concentration may be prepared. Feed supplement formulations containing from about 5% to about 50% by weight, and preferably from about 10 to 30% by weight of active ingredient are particularly suitable for addition to feeds. The active compound is normally dispersed or mixed uniformly in the diluent but in some instances may be adsorbed on the carrier.

These supplements are added to the finished animal feed in an amount adequate to give the final concentration desired for controlling or treating the helminth infection by way of the animal ration. Although the preferred level in feeds will depend on the particular compounds being employed, the active compounds of this invention are normally fed at levels of 0.05–25% in the feed. As stated above, animals are preferably treated at a time when the infestation is apparent or suspected, and the most preferred method for such treatment is via the single oral dose techniques. Thus, administration of medicated feed is not preferred but may certainly be employed. Similarly, the amounts of drug present in the feed may be reduced to levels in the order of 0.001% to 3.0 weight percent based on the weight of feed, and the medicated feed administered over prolonged periods. This would be in the nature of a preventive or propyhlactic measure but again is not the mode of choice. Another method of administering the compounds of this invention to animals whose feeds are conveniently pelleted, such as sheep, is to incorporate them directly in the pellets. For instance, the anthelmintic compound is readily incorporated in nutritionally adequate alfalfa pellets at levels of 2–110 grams per pound of pellets for therapeutic use, and at lower levels for prophylactic use, and such pellets fed to the animals.

In addition to their use in the treatment of helminthiasis, some of the salicylanilides are useful as antibacterial agents. For example, 3,5 - dibromo-N-[2-(3,4-dichlorophenoxy)-5-pyridyl]-salicylanilide and 3,5-dibromo-N-[2-(3-trifluoromethylphenoxy)-5-pyridyl]-salicylanilide show activity against *Proteus vulgaris*, which is found in putrefying materials and is often associated with intestinal disorders, especially in children, and in urinary tract infections; and 3,5-dibromo-N-[2-(p-chlorophenylthio)-5-pyridyl]-salicylanilide, 5 - bromo-N-[2-(3,4-dichlorophenoxy)-5-pyridyl]-2-nitrosalicylanilide, and 3,5-dibromo-N-[2-(3,4 - dichlorophenoxy)-5-pyridyl]-salicylanilide show activity against *Staphylococcus aureus*. The activity against *Staphylococcus aureus* is of particular interest since this organism is common on the skin and is associated with many wound infections.

The following examples are given for the purpose of illustration and not by way of limitation:

EXAMPLE 1

5-nitro-2-(3,4-dichlorophenoxy)-pyridine

A 52% sodium hydride dispersion in mineral oil (12.7 grams, 0.28 mole) and 63 ml. of dimethylformamide, are placed in a 500 ml. flask equipped with a stirrer, dropping funnel, and drying tube. The mixture is cooled in an ice bath and 3,4-dichlorophenol (45 grams, 0.28 mole) dissolved in 63 ml. of dimethylformamide, is added slowly with stirring. After the gaseous evolution has subsided, the reaction flask is placed in an oil bath at 95° C. and is stirred vigorously. 2-chloro-5-nitropyridine (39.5 grams, 0.25 mole) dissolved in 125 ml. of dimethylformamide, is added slowly during 1½ hours with stirring. After the addition is complete, the stirring is continued at 95° C. for 5 hours. The reaction mixture is then cooled to room temperature, and water is added to the reaction mixture to the point of crystallization. The mixture is allowed to stand for 16 hours, after which the solid is filtered off, washed with water, and dried in vacuo at 50° C. Recrystallization from diethyl ether yields 33.6 grams of 5-nitro - 2 - (3,4-dichlorophenoxy)-pyridine, M.P. 103°–104° C.

When in the above procedure 5-chloro-2-nitropyridine is employed in place of 2-chloro-5-nitropyridine, 2-nitro-5-(3,4-dichlorophenoxy)-pyridine is obtained.

EXAMPLE 2

5-amino-2-(3,4-dichlorophenoxy)-pyridine 5-nitro-2-(3,4-dichlorophenoxy)-pyridine (10.0 grams, 0.035 mole) is dissolved in 100 ml. of ethanol. One-half teaspoon of Raney nickel is added, and the mixture is hydrogenated at 40 p.s.i. at room temperature until the theoretical amount of hydrogen is absorbed. The reaction mixture is filtered, and the filtrate is concentrated in vacuo to a light brown oil which crystallizes on standing to yield 9.1 grams of 5-amino-2-(3,4-dichlorophenoxy)-pyridine.

When in the above procedure 5-(3,4-dichlorophenoxy)-2-nitropyridine is employed in place of 2-(3,4-dichlorophenoxy)-5-nitropyridine, there is obtained 2-amino-5-(3,4-dichlorophenoxy)-pyridine.

EXAMPLE 3

3,5-dibromo-N-[2-(3,4-dichlorophenoxy)-5-pyridyl]-salicylamide 5-amino - 2 - (3,4-dichlorophenoxy)-pyridine (0.035 mole), 3,5-dibromo salicylic acid (9.5 grams, 0.035 mole) and 90 ml. of chlorobenzene are placed in a 250 ml. flask equipped with a mechanical stirrer. To this mixture is added with stirring 1.2 ml. of phosphorus trichloride, and the mixture is refluxed for 3 hours. The mixture is filtered hot, and the filtrate is concentrated in vacuo. The residue is recrystallized from methanol to yield 15.0 grams of 3,5-dibromo - N - [2-(3,4-dichlorophenoxy)-5-pyridyl]-salicylamide.

When in the above procedure 3-nitro-5-bromo-salicylic acid, 3,5-diiodo salicylic acid, 3,5-dibromo-6-methoxy salicylic acid, or 3,5-dibromo-6-hydroxy salicylic acid are employed in place of 3,5-dibromo salicylic acid, there are obtained 5-bromo - N - [2-(3,4-dichlorophenoxy)-5-pyridyl]-3-nitro salicylamide, N-[2-(3,4-dichlorophenoxy)-5-pyridyl]-3,5-diiodo salicylamide, 3,5-dibomo-N-[2-(3,4-dichlorophenoxy)-5-pyridyl]-6-methoxy salicylamide, and 3,5-dibromo-N-[2-(3,4-dichlorophenoxy) - 5 - pyridyl]-6-hydroxy salicylamide, respectively.

EXAMPLE 4

5-nitro-2-(m-trifluoromethylphenoxy)-pyridine

Sodium hydride (9.23 grams, 54% dispersion) and 50 ml. of dry dimethylformamide are placed in a 1 liter 3-neck flask equipped with a mechanical stirrer, thermometer, dropping funnel, and drying tube. 3-trifluoromethyl phenol (32.5 grams, 0.2 mole) dissolved in 50 ml. of dry dimethylformamide is added dropwise, and after the addition is complete, the mixture is stirred for 15 minutes. The mixture is then heated to 95° C., and 2-chloro-4-nitro pyridine (31.7 grams, 0.2 mole) dissolved in 100 ml. of dry dimethylformamide is added during one-half hour. After the addition is complete, the mixture is stirred at 95° C. for 5 hours. The reaction mixture is then poured onto 500 ml. of an ice-water mixture. A semi-solid forms, the aqueous dimethylformamide is decanted off, and the residue is dissolved in 300 ml. of benzene. The benzene solution is washed with 2× 2.5 N sodium hydroxide and twice with water, after which the solvent is removed in vacuo, leaving a yellow semi-solid crystalline residue. Chromatography over silica gel yields 22.3 grams of crystalline 5-nitro-2-(m-trifluoromethylphenoxy)-pyridine, M.P. 48°–50° C.

When in the above procedure 2,3-dichloro-5-nitro-pyridine, 3-amino-2-chloro-5-nitro pyridine, and 2-chloro-3-methyl-5-nitro pyridine are employed in place of 2-chloro-5-nitro pyridine, there are obtained 3-chloro-5-nitro-2-(m-trifluoromethylphenoxy)-pyridine, 3-amino-5-nitro-2-(m-trifluoromethylphenoxy)-pyridine, and 3-methyl-5-nitro-2-(m-trifluoromethylphenoxy)-pyridine, respectively.

EXAMPLE 5

5-amino-2-(m-trifluoromethylphenoxy)-pyridine

5 - nitro-2-(m-trifluoromethylphenoxy)-pyridine (22.3 grams) is dissolved in 300 ml. of ethanol, and the solution is hydrogenated using 1 teaspoon of Raney nickel as catalyst until the calculated pressure drop is observed. The catalyst is filtered off and the filtrate is evaporated to dryness to yield 19.8 grams of 5-amino-2-(m-trifluoromethylphenoxy)-pyridine.

When in the above procedure 3-chloro-5-nitro-2-(m-trifluoromethylphenoxy)-pyridine and 3-methyl-5-nitro-2-(m - trifluoromethylphenoxy)-pyridine are employed in place of 5-nitro-2-(m-trifluoromethylphenoxy)-pyridine, there are obtained 3-chloro-5-amino-2-(m-trifluoromethylphenoxy)-pyridine and 3-methyl-5-amino-2-(m-trifluoromethylphenoxy)-pyridine, respectively.

EXAMPLE 6

3,5-dibromo-N-[2-(3-trifluoromethylphenoxy)-5-pyridyl]-salicylamide 3,5-dibromo salicylic acid (23.0 grams, 0.08 mole), 5-amino - 2 - (m-trifluoromethylphenoxy)-pyridine (19.8 grams, 0.08 mole) and 2.71 ml. of phosphorus trichloride are placed in 215 ml. of chlorobenzene, and the mixture is brought to reflux. The solution is refluxed for 3 hours, decanted while still hot, and then cooled to 5° C. The solution is allowed to stand for 16 hours, during which time crystals form. The crystals are filtered off and washed with pet ether. Recrystallization from benzene yields 16.5 grams of pure 3,5-dibromo - N - [2-(3-trifluoromethylphenoxy)-5-pyridyl]-salicylamide, M.P. 152°–253° C.

When in the above procedure 5-amino-3-chloro-2-(m-trifluoromethylphenoxy)-pyridine, 5 - amino-3-methyl-2-(m-trifluoromethylphenoxy)-pyridine, and 5 - amino-3-bromo-2-(m - trifluoromethylphenoxy)-pyridine are employed in place of 5-amino-2-(trifluoromethylphenoxy)-pyridine, there are obtained 3,5-dibromo-N-[3-chloro-2-(3-trifluoromethylphenoxy)-5-pyridyl]-salicylamide, 3,5-dibromo - N - [3 - methyl-2(3-trifluoromethylphenoxy)-5-pyridyl]-salicylamide, and 3,5-dibromo-N-[3-bromo-2-(3-trifluoromethylphenoxy)-5-pyridyl]-salicylamide, respectively.

EXAMPLE 7

5-bromo-N-[2-(3,4-dichlorophenoxy)-5-pyridyl]-3-nitro salicylamide 5-bromo-3-nitro salicylic acid (19.6 grams, 0.07 mole), 5-amino-2-(3,4-dichlorophenoxy)-pyridine (19.8 grams, 0.07 mole), and 3.3 ml. of phosphorus trichloride (0.037 mole) are added to 200 ml. of chlorobenzene, and the mixture is heated to reflux. The solution is refluxed for 3 hours, decanted while still hot, and allowed to come to room temperature. The chlorobenzene is removed in vacuo, and the residue crystallizes on standing. Recrystallization from methanol yields 8 grams of 5-bromo-N-[2-(3,4-dichlorophenoxy)-5-pyridyl]-3-nitro-salicylamide.

When in the above procedure 5-amino-2-phenoxy-pyridine, 5-amino-2-(p-chlorophenoxy)-pyridine, 5-amino-2-(m-trifluoromethylthiophenoxy)-pyridine, 5 - amino-2-(p-methoxyphenoxy)-pyridine, and 5-amino - 2 - (m-trifluoromethylphenoxy)-pyridine are employed in place of 5-amino-2-(3,4-dichlorophenoxy)-pyridine, there are obtained 5-bromo-3-nitro-N-(2-phenoxy-5-pyridyl)-salicylamide, 5-bromo-N-[2-(p-chlorophenoxy) - 5 - pyridyl]-3-nitro salicylamide, 5 - bromo-3-nitro-N-[2-(m-trifluoromethylthiophenoxy)-5-pyridyl]-salicylamide, 5-bromo-N-[2-(p-methoxyphenoxy)-5-pyridyl]-3-nitro salicylamide, and 5-bromo-3-nitro-N-[2-(m-trifluoromethylphenoxy)-5-pyridyl]-salicylamide, respectively.

EXAMPLE 8

3-chloro-4-(3-pyridinoxy)-nitrobenzene

A mixture of 1,2-dichloro-4-nitrobenzene (19.2 grams), 3-pyridinol(10.5 grams), and anhydrous potassium carbonate (16.6 grams), is heated to about 200° C. for one hour. The reaction mixture is then poured into 250 cc. of water. Crystals form on standing. The product is filtered off and washed with water yielding, after drying in vacuo, essentially pure 3-chloro-4-(3-pyridinoxy)-nitrobenzene.

When in the above procedure p-chloronitrobenzene or 1-chloro-2-methyl-4-nitrobenzene are employed in place of 1,2-dichloro-4-nitrobenzene, there are obtained 4-(3-pyridinoxy)-nitrobenzene and 3-methyl-4-(3-pyridinoxy)-nitrobenzene, respectively.

EXAMPLE 9

3-chloro-4-(3-pyridinoxy)-aniline 3-chloro-4-(3-pyridinoxy)-nitrobenzene (10.0 grams) is dissolved in 200 ml. of methanol and is hydrogenated in the presence of Raney nickel at 40 pounds pressure. After the theoretical amount of hydrogen is adsorbed, the catalyst is filtered off, and the filtrate is concentrated in vacuo to a light oil. The crude 3-chloro-4-(3-pyridinoxy)-aniline is used without further purification.

When in the above procedure 3-methyl-4-(3-pyridinoxy)-nitrobenzene and 4-(3-pyridinoxy)-nitrobenzene are employed in place of 3-chloro-4-(3-pyridinoxy)-nitrobenzene, there are obtained 3-methyl-4-(3-pyridinoxy)-aniline and 4-(3-pyridinoxy)-aniline, respectively.

EXAMPLE 10

3'-chloro-3,5-dibromo-4'-(3-pyridinoxy)-salicylanilide 3,5-dibromo salicyclic acid (1.0 gram), 3-chloro-4-(3-pyridinoxy)-aniline (0.68 gram), and phosphorus trichloride (0.15 ml.) are placed in 20 ml. of chlorobenzene, and the mixture is refluxed for 4 hours. The reaction mixture is then allowed to cool to room temperature, after which it is washed several times with a saturated aqueous solution of sodium bicarbonate, several times with water, and finally dried over magnesium sulfate. The solution is concentrated to a small volume in vacuo, and upon standing, essentially pure crystalline 3'-chloro-3,5-dibromo-4'-(3-pyridinoxy)-salicylanilide is obtained.

When in the above procedure 5-bromo-3-nitro salicyclic acid, 3,5-dibromo-6-hydroxy salicylic acid, and 3,5-diiodo salicylic acid are employed in place of 3,5-dibromo salicylic acid, there are obtained 5-bromo-3'-chloro-3-nitro - 4' - (3-pyridinoxy)-salicylanilide, 3'-chloro-3,5-dibromo-6-hydroxy-4'-(3-pyridinoxy)-salicylanilide, and 3'-chloro - 3,5 - diiodo - 4' - (3 - pyridinoxy)-salicylanilide, respectively.

EXAMPLE 11

5-nitro-2-(p-chlorophenylthio)-pyridine

2 - chloro - 5 - nitro pyridine (31.7 grams, 0.2 mole), p-chlorothio phenol (36.2 grams, 0.25 mole), and potassium carbonate (34.6 grams, 0.25 mole) are placed in 100 ml. of dry dimethylformamide. The mixture is heated in an oil bath at 85° C. for 2 hours. A sample is removed and poured into a mixture of ice and water. The precipitate which forms is filtered and washed with 2.5 N sodium hydroxide and water. A brown solid is collected, melting at 128°–132° C. Thin layer chromatography indicates the presence of some starting material. The reaction mixture is heated for an additional 2 hours at 85° C., after which the entire mixture is poured into a mixture of ice water. The solid which forms is filtered off and washed with 2.5 N sodium hydroxide and finally with water. The brown solid is recrystallized from ethyl acetate. A second recrystallization from acetone yields 21.3 grams of crystalline 5 - nitro - 2 - (p-chlorophenylthio)-pyridine, M.P. 136°–138° C.

Wren in the above procedure 5-chloro-2-nitro pyridine is employed in place of 2-chloro-5-nitropyridine, 2-nitro-5-(p-chlorophenylthio)-pyridine is obtained.

EXAMPLE 12

5-amino-2-(p-chlorophenylthio)-pyridine 5-nitro-2-(p-chlorophenylthio)-pyridine (21.3 grams), is dissolved in 300 ml. of ethanol. One teaspoon of Raney nickel is added, and the mixture is hydrogenated until the theoretical amount of hydrogen is absorbed. The reaction mixture is filtered and the filtrate is concentrated in vacuo to yield 18.7 grams of 5-amino-2-(p-chlorophenylthio)-pyridine as a pale brown oil.

When in the above procedure 5-(p-chlorophenylthio)-2-nitro pyridine is employed in place of 5-nitro-2-(p-chlorophenylthio)-pyridine, 2-amino-5-(p-chlorophenylthio)-pyridine is obtained.

EXAMPLE 13

3,5-dibromo-N-[2-(p-chlorophenylthio)-5-pyridyl]-salicylamide 5-amino-2-(p-chlorophenylthio)-pyridine (18.7 grams, 0.079 mole), 3,5-dibromo salicylic acid (23.4 grams, 0.079 mole), and phosphorus trichloride (2.76 ml.) are placed in 225 ml. of chlorobenzene, and the mixture is refluxed for one hour. An additional 100 ml. of chlorobenzene and 1 ml. of phosphorus trichloride are added to place the reactants into solution. The mixture is then refluxed for 3 hours, after which it is cooled slightly and filtered. The yellow solid is collected and is dissolved in warm dimethylformamide. A saturated solution of sodium bicarbonate is added in portions until the evolution of gas ceases. Warm water is added to the point of turbidity, and the solution is allowed to cool to room temperature. A precipitate forms on standing, and is filtered off and washed with water. The brown solid is then dissolved in dimethylformamide, and the solution is acidified with 2.5 N hydrochloric acid. The solid which forms on standing is filtered off and washed with water. Recrystallization from benzene yields 8.5 grams of 3,5-dibromo-N-[2-(p-chlorophenylthio)-5-pyridyl]-salicylamide, M.P. 215°–216° C.

When in the above procedure 3-nitro-5-bromosalicylic acid, 3,5-diiodo salicylic acid, and 3,5-dibromo-6-hydroxy salicylic acid are employed in place of 3,5-dibromosalicylic acid, there are obtained 5-bromo-N-[2-(p-chlorophenylthio) - 5 - pyridyl]-3-nitro salicylamide, N-[2-(p-chlorophenylthio)-5-pyridyl]-3,5-diiodo salicylamide, and 3,5 - dibromo - N-[2-(p-chlorophenylthio)-5-pyridyl]-6-hydroxy salicylamide, respectively.

EXAMPLE 14

4-(3-pyridinethio)-nitrobenzene p-Chloro nitrobenzene (1.57 grams, .01 mole), 3-mercapto pyridine (1.11 grams, .010 mole), and potassium carbonate (1.65 grams, .015 mole) are placed in 25 ml. of dry dimethylformamide. The mixture is heated in an oil bath at 85° C. for 4 hours, after which the entire mixture is poured into a mixture of ice and water. The solid which forms is filtered off and washed with 2.5 N sodium hydroxide and finally with water. Recrystallization from acetone yields pure 4-(3-pyridinethio)-nitrobenzene.

EXAMPLE 15

4-(3-pyridinethio)-aniline 4-(3-pyridinethio)-nitrobenzene (2.32 grams, .01 mole) is dissolved in 30 ml. of ethanol. Raney nickel (.05 gram) is added, and the mixture is hydrogenated until the theoretical amount of hydrogen is absorbed. The reaction mixture is then filtered, and the filtrate is concentrated in vacuo to yield 4-(3-pyridinethio)-aniline as an oil.

EXAMPLE 16

3,5-dibromo-4'-(3-pyridinethio)-salicylanilide 4-(3-pyridinethio)-aniline (2.02 grams, .01 mole) 3,5-dibromo salicylic acid (2.95 grams, .01 mole), and phosphorus trichloride (.5 ml., .005 mole) are placed in 25 ml. of chlorobenzene, and the mixture is refluxed for 3 hours. The mixture is filtered while still hot, and the filtrate is concentrated in vacuo. Upon recrystallization from methanol, 3,5-dibromo-4'-(3-pyridinethio)-salicylanilide is obtained.

When in the above procedure 5-bromo-3-nitro-salicylic acid, 3,5-diiodo salicylic acid, and 3,5-dibromo-6-hydroxy salicylic acid are employed in place of 3,5-dibromo salicylic acid, there are obtained 5-bromo-3-nitro-4'-(3-pyridinethio)-salicylanilide, 3,5-diiodo-4'-(3-pyridinethio)-salicylanilide, and 3,5-dibromo-6-hydroxy-4'-(3-pyridinethio)-salicylanilide, respectively.

It should be understood that although this invention has been described with reference to particular embodiments thereof, changes and modifications may be made which are within its intended scope, and it should be limited only by the language of the appended claims.

What is claimed is:
1. A compound of the formula

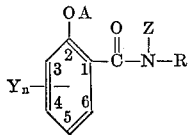

and the pharmaceutically acceptable salts thereof, where A is hydrogen or loweralkanoyl; $n$ equals 0–3; Y is halogen, hydroxy, haloloweralkyl, loweralkoxy, and nitro; R is an aromatic residue selected from the group consisting of phenoxypyridine, phenylthiopyridine, pyridinoxybenzene, and pyridinethiobenzene, with a proviso that the pyridine ring is attached to the amide nitrogen in the ortho or meta position and only the meta position when attached to the oxybenzene or thiobenzene radical, and each of said aromatic rings may be substituted with a member selected from the group consisting of halogen, loweralkyl, haloloweralkyl, loweralkoxy, nitro, cyano, halolower alkoxy, halolower alkylthio, and amino; and Z is hydrogen or loweralkyl.

2. A compound of claim 1 wherein R is phenoxypyridine or pyridinoxybenzene.

3. A compound of claim 1 wherein Y is halogen, nitro, or hydroxy; Z is hydrogen; and at least one of the substituents on the aromatic rings of R is chloro, bromo or trifluoromethyl.

4. The compound of claim 2, which compound is 3,5-diiodo - N - [2 - (3,4 - dichlorophenoxy) - 5 - pyridyl]-salicylamide.

5. The compound of claim 2, which compound is 3,5-dibromo - N - [2 - (3,4 - dichlorophenoxy) - 5 - pyridyl]-salcylamide.

6. The compound of claim 2, which compound is 3,5-dibromo - N - [2 - (m - trifluoromethylphenoxy) - 5 - pyridyl]-salicylamide.

7. The compound of claim 2, which compound is 5-bromo - N - [2 - (3,4 - dichlorophenoxy) - 5 - pyridyl]-3-nitrosalicylamide.

8. The compounds of claim 1, wherein R is phenylthiopyridine or pyridinethiobenzene.

9. The compound of claim 8, which compound is 3,5-dibromo - N - [2 - (p - chlorophenylthio) - 5 - pyridyl]-salcylamide.

References Cited

Weuffen et al: Chem. Abstracts, vol. 65, December 1966.

Weuffen et al.: Chem. Abstracts, vol. 66, February 1967.

Paris et al.: J. Med. Chem. vol. 9, p. 971 (1966).

HENRY R. JILES, Primary Examiner

A. L. ROTMAN, Assistant Examiner

U.S. Cl. X.R.

260—294.9, 295, 295.5; 424—266